(12) United States Patent
Li et al.

(10) Patent No.: US 11,821,733 B2
(45) Date of Patent: Nov. 21, 2023

(54) TERRAIN REFERENCED NAVIGATION SYSTEM WITH GENERIC TERRAIN SENSORS FOR CORRECTING AN INERTIAL NAVIGATION SOLUTION

(71) Applicant: The Boeing Company, Chicago, IL (US)

(72) Inventors: Rongsheng Li, Hacienda Heights, CA (US); Chang Jin Yoo, Huntington Beach, CA (US); Cody Gruebele, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 498 days.

(21) Appl. No.: 16/748,253

(22) Filed: Jan. 21, 2020

(65) Prior Publication Data
US 2023/0314141 A1 Oct. 5, 2023

(51) Int. Cl.
*G06F 17/10* (2006.01)
*G06G 7/78* (2006.01)
*G08G 1/16* (2006.01)
*G01C 21/00* (2006.01)
(Continued)

(52) U.S. Cl.
CPC ......... *G01C 21/005* (2013.01); *G01C 21/165* (2013.01); *G08G 5/0086* (2013.01)

(58) Field of Classification Search
CPC .... G01C 21/005; G01C 21/165; G01C 21/00; G01C 21/16; G01C 21/04; G08G 5/0086
See application file for complete search history.

(56) References Cited

U.S. PATENT DOCUMENTS

| 4,954,837 A | 9/1990 | Baird et al. |
| 5,335,181 A | 8/1994 | McGuffin |
| 9,648,313 B1 * | 5/2017 | Henry .................. G06F 1/1637 |

(Continued)

FOREIGN PATENT DOCUMENTS

| DE | 102017121950 A1 | 11/2018 |
| WO | 0102804 A1 | 1/2001 |

OTHER PUBLICATIONS

IET Radar, Sonar and Navigation; by Hyun Cheol Jeon, "Modified sequential processing terrain referenced navigation considering slant range measurement" (Year: 2018).*

(Continued)

*Primary Examiner* — Sohana Tanju Khayer
(74) *Attorney, Agent, or Firm* — Vivacqua Crane PLLC

(57) ABSTRACT

A terrain referenced navigation system for a vehicle is disclosed and includes an inertial measurement unit and one or more generic terrain sensors configured to collect terrain-dependent data. The terrain referenced navigation system includes one or more processors in electronic communication with the generic terrain sensors and the inertial measurement unit, and a memory coupled to the processors. The memory stores data into one or more databases and program code that, when executed by the processors, causes the terrain referenced navigation system to determine a predicted terrain value based on a terrain value, where the terrain value is retrieved from one or more sensor specific terrain databases. The pre-Kalman filter processing values are sent to a Kalman filter. The Kalman filter determines navigation corrections and sensor corrections based on the pre-Kalman filter processing values.

20 Claims, 10 Drawing Sheets

(51) Int. Cl.
*G01C 21/16* (2006.01)
*G08G 5/00* (2006.01)

(56) References Cited

U.S. PATENT DOCUMENTS

| | | | | |
|---|---|---|---|---|
| 2006/0004519 | A1* | 1/2006 | Humphrey | G01V 7/16 |
| | | | | 702/3 |
| 2007/0010939 | A1* | 1/2007 | Kreutz | G01C 21/00 |
| | | | | 701/518 |
| 2013/0073253 | A1* | 3/2013 | Handa | G01R 33/0206 |
| | | | | 702/152 |
| 2016/0000365 | A1* | 1/2016 | Kushki | A61B 5/725 |
| | | | | 600/300 |
| 2016/0335901 | A1* | 11/2016 | Singh | G01C 23/00 |
| 2016/0356890 | A1* | 12/2016 | Fried | G01S 7/4863 |
| 2018/0128616 | A1* | 5/2018 | Malvern | G01C 21/005 |
| 2018/0308226 | A1* | 10/2018 | Kim | G01C 21/24 |
| 2019/0086920 | A1* | 3/2019 | Miller | B64D 17/80 |
| 2019/0107846 | A1* | 4/2019 | Roy | G08G 5/0013 |
| 2019/0187280 | A1* | 6/2019 | Lodden | B64D 43/02 |
| 2020/0118449 | A1* | 4/2020 | Rose | G01S 19/49 |
| 2020/0312170 | A1* | 10/2020 | Sherback | G07C 5/0841 |
| 2021/0064847 | A1* | 3/2021 | Cypriano | G01S 19/20 |
| 2021/0206519 | A1* | 7/2021 | Shockley | B64G 1/405 |

OTHER PUBLICATIONS

European Patent Office. Extended European Search Report for EP Application No. 20208486.9, dated May 19, 2021, pp. 1-9.

Jeon Hyun Cheol et al. "Modified sequential processing terrain referenced navigation considering slant range measurement," IET Radar Sonar Navigation, The Institution of Engineering Technology, UK, vol. 12, No. 11, Nov. 1, 2018, pp. 1208-1216, XP006070250, ISSN: 1751-8784, DOI: 10.1049/IET-RSN.2018.5170, paragraphs [0001]-[0003].

European Patent Office. Extended European Search Report for EP Application No. 20208486.9, dated Sep. 21, 2023, pp. 1-5.

* cited by examiner

TERRAIN REFERENCED NAVIGATION SYSTEM WITH GENERIC TERRAIN SENSORS FOR CORRECTING AN INERTIAL NAVIGATION SOLUTION

INTRODUCTION

The present disclosure relates to terrain referenced navigation systems. More particularly, the present disclosure is directed towards a terrain referenced navigation system including one or more generic terrain sensors for collecting data used to correct an inertial navigation solution.

BACKGROUND

A terrain referenced navigation system provides navigation assistance by referencing a position of a vehicle with respect to a terrain database. Typical navigation systems determine a navigation solution based on measurements from an inertial measurement unit. However, inertial measurement units produce errors that increase over time that are caused by integrations within inertial navigation algorithms. Thus, terrain based navigation systems blend the navigational solution, which is based on measurements from the inertial measurement unit, with terrain measurements. The terrain measurements have generally been obtained by using radar altimeters, however, other sensors such as cameras may be used as well.

Global positioning systems (GPS) and global navigation satellite systems (GNSS) are more widely used when compared to terrain referenced navigation systems. However, GPS and GNSS signals are more susceptible to external interference when compared to terrain referenced navigation systems. Specifically, GPS and other GNSS signals are low in power, thereby making them susceptible to disruption by even very low power interferences. For example, GPS denial may be caused by unintentional interference or intentional interference and is referred to as jamming. In contrast, terrain referenced navigation systems are resistant to jamming. As a result, terrain referenced navigation systems may be used as an alternative or a supplemental solution when GPS and GNSS systems are unavailable.

SUMMARY

According to several aspects, a terrain referenced navigation system for a vehicle is disclosed. The terrain referenced navigation system includes an inertial measurement unit including a plurality of sensors for measuring an acceleration and a rotation rate of the vehicle as well as one or more generic terrain sensors configured to collect terrain-dependent data. The terrain-dependent data includes a measured terrain value. The terrain referenced navigation system also includes one or more processors in electronic communication with the one or more generic terrain sensors and the inertial measurement unit, and a memory coupled to the one or more processors. The memory stores data into one or more databases and program code that, when executed by the one or more processors, causes the terrain referenced navigation system to determine an inertial navigation solution based on the acceleration and rotation rate of the vehicle measured by the plurality of sensors of the inertial measurement unit. The system also determines a predicted terrain value based on a terrain value. The terrain value is retrieved from one or more sensor specific terrain databases and represents a predicted terrain-dependent value that corresponds to a particular data type being measured by the one or more generic terrain sensors. The system determines pre-Kalman filter processing values between the predicted terrain value and the measured terrain value. The system also determines, by a Kalman filter, navigation corrections and sensor corrections based on the pre-Kalman filter processing values and applies the sensor corrections to the inertial navigation solution and correct the inertial navigation solution with the navigation corrections and to determine a navigation solution.

In another aspect, a method for determining a navigation solution by a disclosed terrain referenced navigation system that is part of a vehicle is disclosed. The method includes determining, by a computer, an inertial navigation solution based on an acceleration and a rotation rate of the vehicle measured by a plurality of sensors that are part of an inertial measurement unit. The method also includes determining, by the computer, a predicted terrain value based a terrain value. The terrain value is retrieved from one or more sensor specific terrain databases and represents a predicted terrain-dependent value that corresponds to a particular data type being measured by one or more generic terrain sensors. The method also includes determining, by the computer, pre-Kalman filter processing values between the predicted terrain value and a measured terrain value. The method further includes determining, by a Kalman filter, navigation corrections and sensor corrections based on the pre-Kalman filter processing values. Finally, the method includes applying the sensor corrections to the inertial navigation solution and correcting the inertial navigation solution with the navigation corrections and to determine a navigation solution.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a terrain referenced navigation system for a vehicle, where the terrain referenced navigation system includes an inertial measurement unit and one or more generic terrain sensors. The generic terrain sensors are configured to collect terrain-dependent data. The terrain referenced navigation system determines a navigation solution by combining navigation corrections and the sensor corrections determined based on data collected by the generic terrain sensors with an inertial navigation solution. The inertial navigation solution is determined based on measurements from the inertial measurement unit. It is to be appreciated that any combination of generic terrain sensors may be used to determine the navigation and sensor corrections, without the need to significantly change any hardware or software architecture.

The following description is merely exemplary in nature and is not intended to limit the present disclosure, application, or uses.

Figure 1:
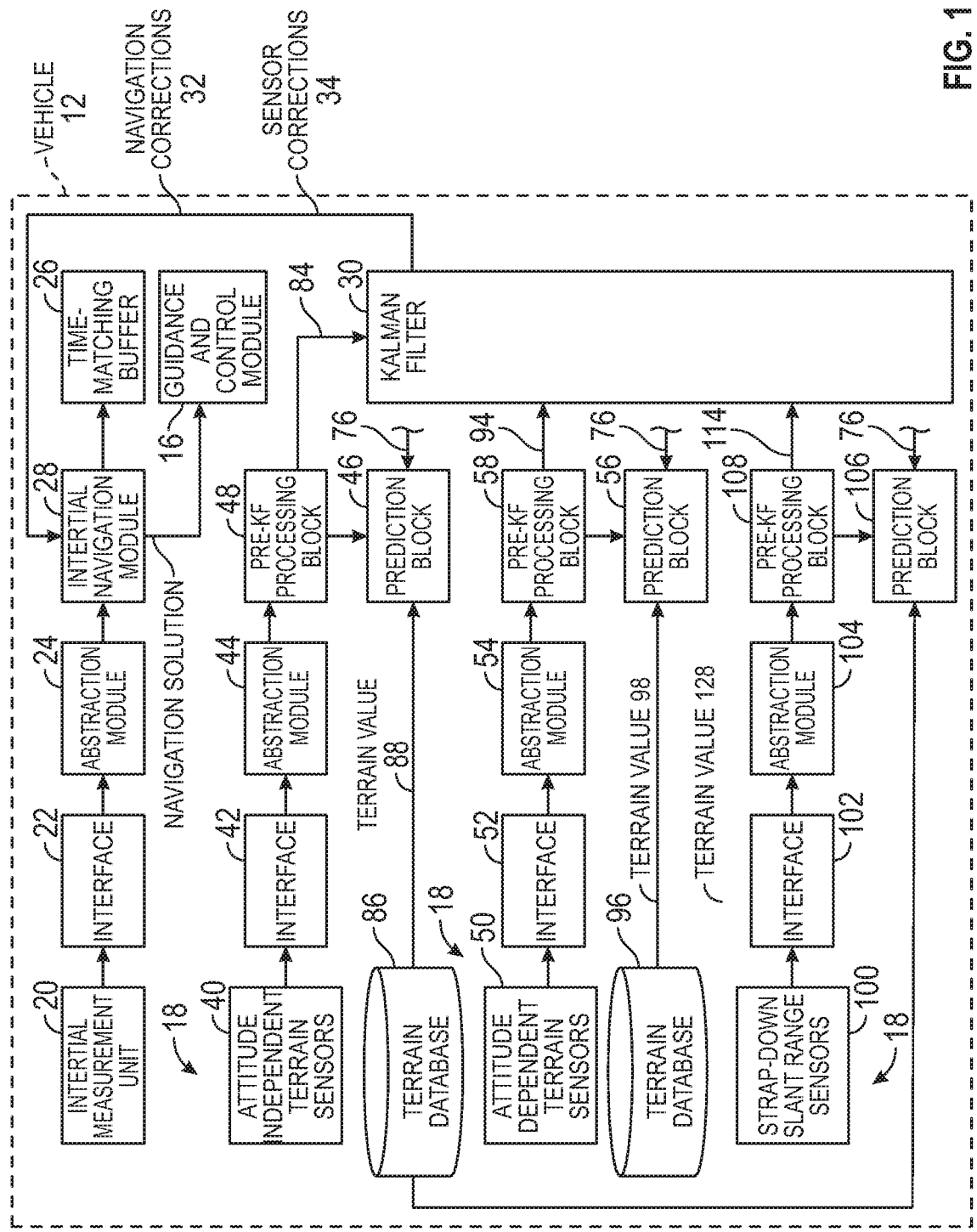
FIG. 1 is a schematic block diagram illustrating the disclosed navigation system including an inertial measurement unit and one or more generic terrain sensors, according to an exemplary embodiment.

Referring to FIG. 1, an exemplary schematic diagram of a terrain referenced navigation system 10 for a vehicle 12 is shown. The terrain referenced navigation system 10 is configured to determine a position of the vehicle 12 in a frame of reference of the Earth. One example of a frame of reference of the Earth is an Earth-centered, Earth-fixed (ECEF) frame of reference. Alternatively, in another embodiment, the latitude, longitude, and altitude may be used instead. The terrain referenced navigation system 10 includes a guidance and control module 16, one or more generic terrain sensors 18, and an inertial measurement unit 20. The terrain referenced navigation system 10 also includes an inertial navigation module 28 that determines a navigation solution indicating a position, a velocity, and an attitude of the vehicle 12. In an embodiment, the guidance and control module 16 may be omitted.

The generic terrain sensors 18 include any type of sensor measuring a stimulus that is a function of the location. The generic terrain sensors 18 are configured to collect terrain-dependent data such as, for example, altitude, gravitational force, or magnetic field. As explained below, the inertial navigation module 28 determines the navigation solution based on inertial measurement data 70 (seen in FIG. 2) collected by the inertial measurement unit 20 and corrections derived by the terrain-dependent data from the generic terrain sensors 18.

The terrain referenced navigation system 10 also includes a Kalman filter 30 configured to determine navigation corrections 32 that are sent to the inertial navigation module 28. Specifically, the Kalman filter 30 fuses terrain-dependent data collected by the generic terrain sensors 18 with the inertial measurement data 70 (FIG. 2) collected by the inertial measurement unit 20 to determine the navigation corrections 32. The navigation corrections 32 include position corrections, velocity corrections, and attitude corrections of the vehicle 12.

In addition to the navigation corrections 32, the Kalman filter 30 also determines sensor corrections 34. The sensor corrections 34 represent the application of correction parameters that are used to model and parameterize error associated with the sensors 60 of the inertial measurement unit 20 (seen in FIG. 2) as well as the generic terrain sensors 18. Examples of the correction parameters for the inertial measurement unit 20 include gyro and accelerometer biases, scale factor errors, and misalignments. Examples of the correction parameters for the generic terrain sensors 18 include alignment errors and sensor biases. The navigation corrections 32 and the sensor corrections 34 determined based on the data collected from the inertial measurement unit 20 are sent to the inertial navigation module 28. Accordingly, the inertial navigation module 28 determines the navigation solution based on the navigation corrections 32 and the sensor corrections 34 of the inertial measurement unit 20. The terrain referenced navigation system 10 is interchangeable in the sense that any combination of generic terrain sensors 18 are used to determine the navigation corrections 32 and the sensor correction 34 without the need to change the hardware architecture or make substantial changes to the software.

In one exemplary embodiment, the navigation solution is sent to the guidance and control module 16. The guidance and control module 16 is configured to control movement of the vehicle 12 based at least in part on the navigation solution received from the inertial navigation module 28. For example, if the vehicle 12 is an aircraft, then the guidance and control system 16 is a flight controller. The vehicle 12 may be, but is not limited to, a ground vehicle, an aircraft, an unmanned aerial vehicle (UAV), a helicopter, a missile, a marine vehicle such as a submarine, an unmanned underwater vehicle (UUV), or an unmanned ground vehicle (UGV).

The generic terrain sensors 18 measure terrain-dependent data such as, but not limited to, terrain altitude, slant range to ground, gravity, gravity gradient, or magnetic field. The one or more generic terrain sensors 18 include one or more attitude independent terrain sensors 40 or, alternatively, one or more attitude dependent terrain sensors 50. In another embodiment, the one or more generic terrain sensors 18 includes one or more attitude independent terrain sensors 40 in combination with one or more attitude dependent terrain sensors 50. Although FIG. 1 illustrates only a single attitude independent terrain sensor 40 and a single attitude dependent terrain sensor 50, in some embodiments the terrain referenced navigation system 10 includes a plurality of attitude independent terrain sensors 40 (seen in FIG. 3A), a plurality of attitude dependent terrain sensors 50 (shown in FIG. 4A), or both of the aforementioned terrain sensors 40, 50.

The attitude independent terrain sensors 40 include, but are not limited to, a radar altimeter, a lidar altimeter, a gravimeter on a platform, a gravity-gradiometer on a platform, or a magnetometer on a platform. It is to be appreciated that a sensor mounted to a platform indicates a sensor's measurement is independent of the attitude of the vehicle 12, and not that a particular sensor is necessarily physically mounted to a locally level platform. The attitude dependent terrain sensors 50 include, but are not limited to, a strap-down slant range sensor, a strap-down lidar sensor, a strap-down sonar sensor, a strap-down gravimeter, a strap-down gravity gradiometer, and a strap-down magnetometer. FIG. 1 also illustrates one or more strap-down slant ranges sensors 100, which are described below.

Figure 2:
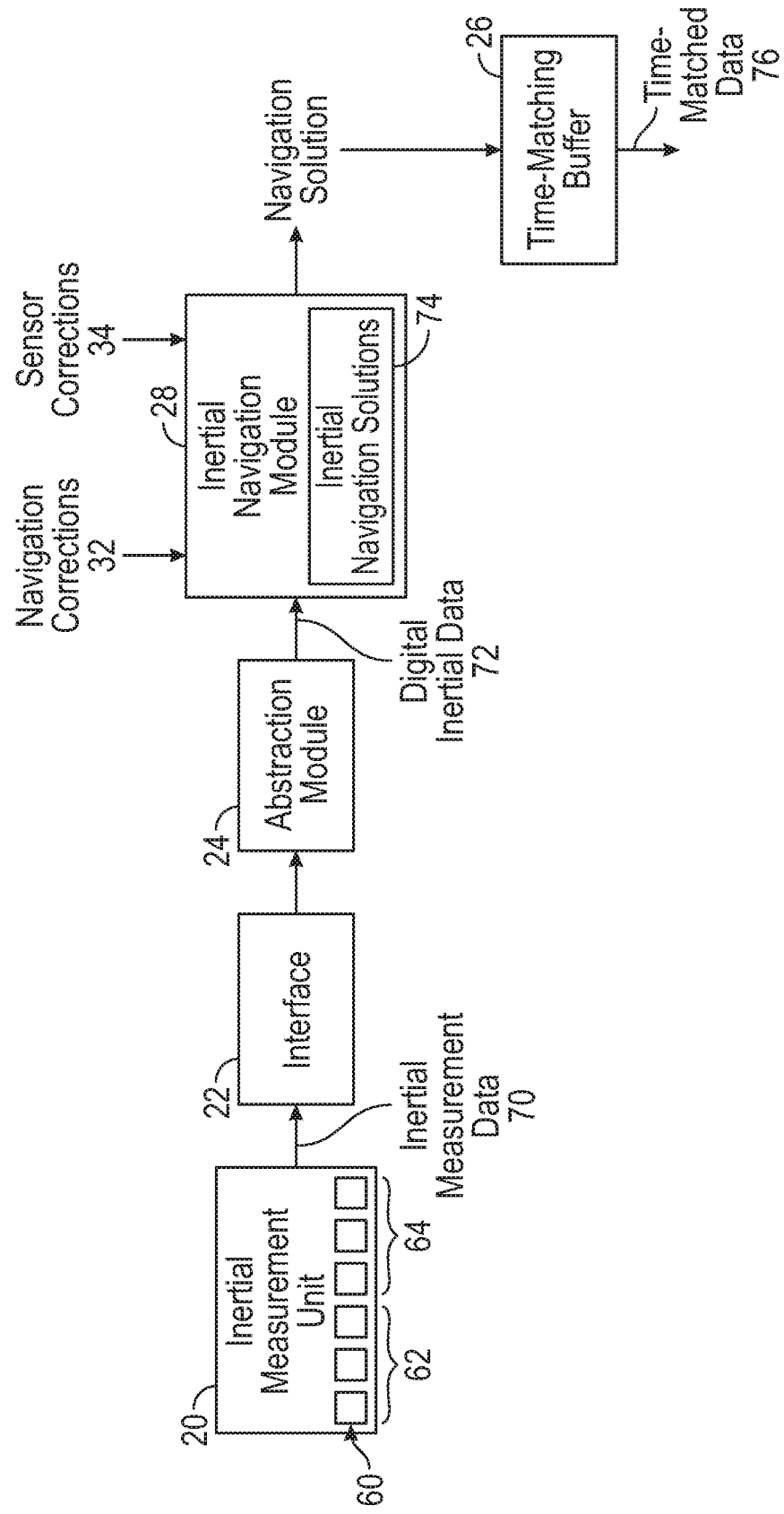
FIG. 2 illustrates the inertial measurement unit shown in FIG. 1 and an inertial navigation module, where the inertial navigation module determines a navigation solution based on inertial data collected from an inertial measurement unit, according to an exemplary embodiment.

The inertial measurement unit 20 is in electronic communication with the rest of the terrain referenced navigation system 10 by way of an inertial measurement unit interface 22. Similarly, the attitude independent terrain sensors 40 are in electronic communication with the rest of the terrain referenced navigation system 10 by an attitude independent sensor interface 42 and the attitude dependent terrain sensors 50 are in electronic communication with rest of the terrain referenced navigation system 10 by an attitude dependent sensor interface 52. The terrain referenced navigation system 10 also includes an inertial measurement unit abstraction module 24 and a time-matching buffer module 26. Referring to FIG. 2, the inertial measurement unit interface 22 includes a plurality of sensors 60 for measuring an acceleration and a rotation rate of the vehicle 12. In one exemplary embodiment, the plurality of sensors 60 include three accelerometers 62 for measuring acceleration and three gyroscopes 64 for measuring the rate of rotation of the vehicle 12. The inertial navigation module 28 determines an inertial navigation solution 74 based on the acceleration and rotation rate of the vehicle 12 measured by the plurality of sensors 60 of the inertial measurement unit 20.

The inertial measurement unit 20 generates a time sequence of inertial measurement data 70 that represents a specific area of the Earth's surface based on measurements by the sensors 60. The inertial measurement unit abstraction module 24 processes and encodes the inertial measurement data 70 to form digital inertial data 72 representing measurements collected by the sensors 60 from the inertial measurement unit 20. The inertial measurement unit abstraction module 24 sends the digital inertial data 72 to the inertial navigation module 28. The inertial navigation module 28 executes an inertial navigation algorithm to analyze the digital inertial data 72 from the inertial measurement unit abstraction module 24 to produce a time sequence of inertial navigation solutions 74 that represent a changing location, velocity, and attitude of the vehicle 12. The inertial navigation solutions 74 utilizes the sensor corrections 34 correlating to the sensors 60 that are part of the inertial measurement unit 20 to perform any corrections to digital inertial data 72 first, and then the inertial navigation solutions 74 are then corrected with the navigation corrections 32 determined by the Kalman filter 30 to determine the navigation solution.

Continuing to refer to FIG. 2, the time-matching buffer module 26 includes executable code to store the navigation solution with a corresponding time-tag into a first-in-first-out buffer or a circular buffer. Accordingly, the time-matching buffer module 26 provides time-matched data 76 including a time-matched position, a time-matched velocity, and a time-matched attitude of the vehicle 12 when provided with a time-tag of corresponding measurements from the generic terrain sensors 18. As seen in FIG. 1, the time-matched data 76 is provided to prediction blocks 46, 56, and 106. The prediction blocks 46, 56, and 106 are described in greater detail below.

Figure 3A:
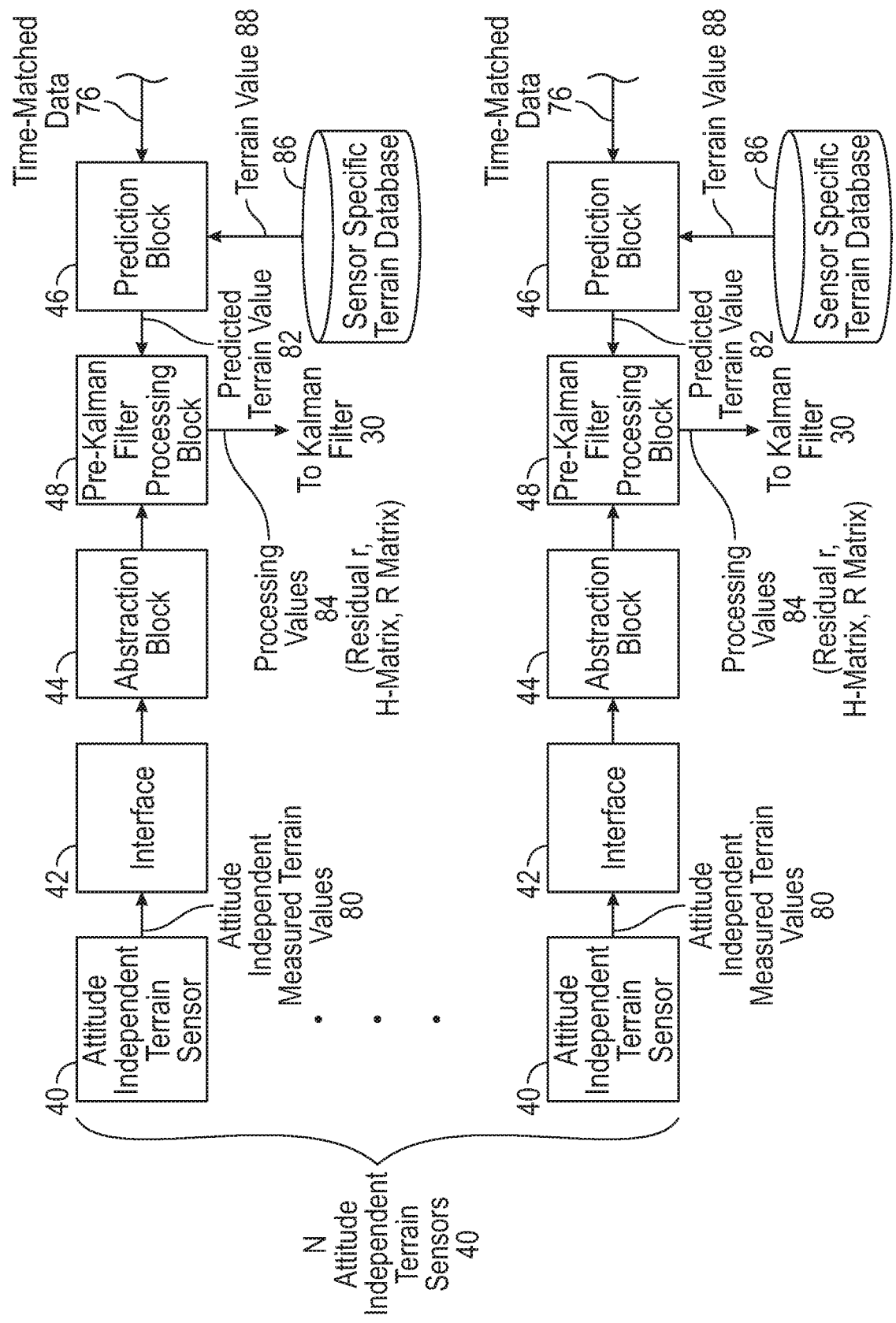
FIG. 3A is a block diagram of one or more attitude independent terrain sensors that are part of the terrain referenced navigation system shown in FIG. 1, where the attitude dependent terrain sensors collect attitude independent measured terrain values, according to an exemplary embodiment.

Referring to FIGS. 1 and 3A, as mentioned above, the attitude independent terrain sensors 40 are in electronic communication with the rest of the terrain referenced navigation system 10 by an attitude independent sensor interface 42. Referring specifically to FIG. 3A, the terrain referenced navigation system 10 includes N attitude independent terrain sensors 40, where N is any whole number. For example, in one embodiment the terrain referenced navigation system 10 includes a radar altimeter, a gravimeter and a magnetometer on a platform. As a result, N would be equal to three. Each attitude independent terrain sensor 40 is in electronic communication with a corresponding attitude independent sensor interface 42, an attitude independent abstraction module 44, an attitude independent sensor prediction block 46, and attitude independent sensor pre-Kalman Filter processing block 48.

Each attitude independent terrain sensor 40 collects the terrain-dependent data, where the terrain-dependent data includes a measured terrain value. The measured terrain value is a function of the location, which is also determined by inertial navigation by using the sensors 60 of the inertial measurement unit 20. Specifically, as seen in FIG. 3A, the attitude independent terrain sensors 40 each generate a time sequence of attitude independent measured terrain values 80 that are sent to a corresponding one of the attitude independent sensor interfaces 42. The attitude independent sensor interfaces 42 are in communication with a corresponding one of the attitude independent abstraction modules 44 that process and encode the attitude independent measured terrain values 80 generated by the corresponding attitude independent terrain sensors 40. The attitude independent measured terrain values 80 collected by each of the attitude independent terrain sensors 40 are then sent to a corresponding attitude independent sensor prediction block 46.

Referring to FIG. 1, the terrain referenced navigation system 10 further includes one or more sensor specific terrain databases 86, 96, where the one or more sensor specific terrain databases 86, 96 store digital values that each represent a terrain value that is a function of the location. Referring to FIG. 3A, the plurality of sensor specific databases 86 store digital information representing a specific terrain value, such as height, gravity, a gravity gradient, and magnetic field. For example, in an embodiment, one of the sensor specific terrain databases 86 stores height information as a function of the position and is expressed by two components, where one of the components represents latitude and the second component represents longitude. In an embodiment, one of the sensor specific terrain databases 86 stores gravity information as a function of the position and is expressed by one, two, or three components as a function of latitude, longitude, attitude, or as a function of position in ECEF coordinates.

In one embodiment, one of the sensor specific terrain databases 86 stores the gravity gradient as a function of the position and is expressed as one, two three, four, or five components. It is to be appreciated that the gravity gradient may be expressed using five components instead of only three components like the gravity. This is because the gravity gradient is expressed by a 3×3 matrix having nine elements, while the gravity is only expressed as a 3×1 vector. Since the 3×3 matrix expressing the gravity gradient is symmetric, and because the sum of the diagonal elements of the 3×3 matrix is equal to zero, there are five independent variables left in the 3×3 matrix. In another embodiment, one of the sensor specific terrain databases 86 store the magnetic field as a function of location. The magnetic field is stored as one, two, or, three components as functions of latitude, longitude, altitude, or as functions of position in ECEF coordinates.

The digital data may be derived either analytically or empirically and is either self-generated or, alternatively, imported from an external source. Referring to FIGS. 1 and 3A, the terrain value 88 from the one or more sensor specific terrain databases 86 is sent to the attitude independent sensor prediction block 46. The terrain value 88 represents a predicted terrain-dependent value that corresponds to the particular data type being measured by the particular generic terrain sensors 18 (in the current example, the attitude independent terrain sensors 40). For example, if the attitude independent terrain sensors 40 include a radar altimeter, then the predicted terrain-dependent value is the altitude above the terrain presently beneath the vehicle 12.

Figure 3B:
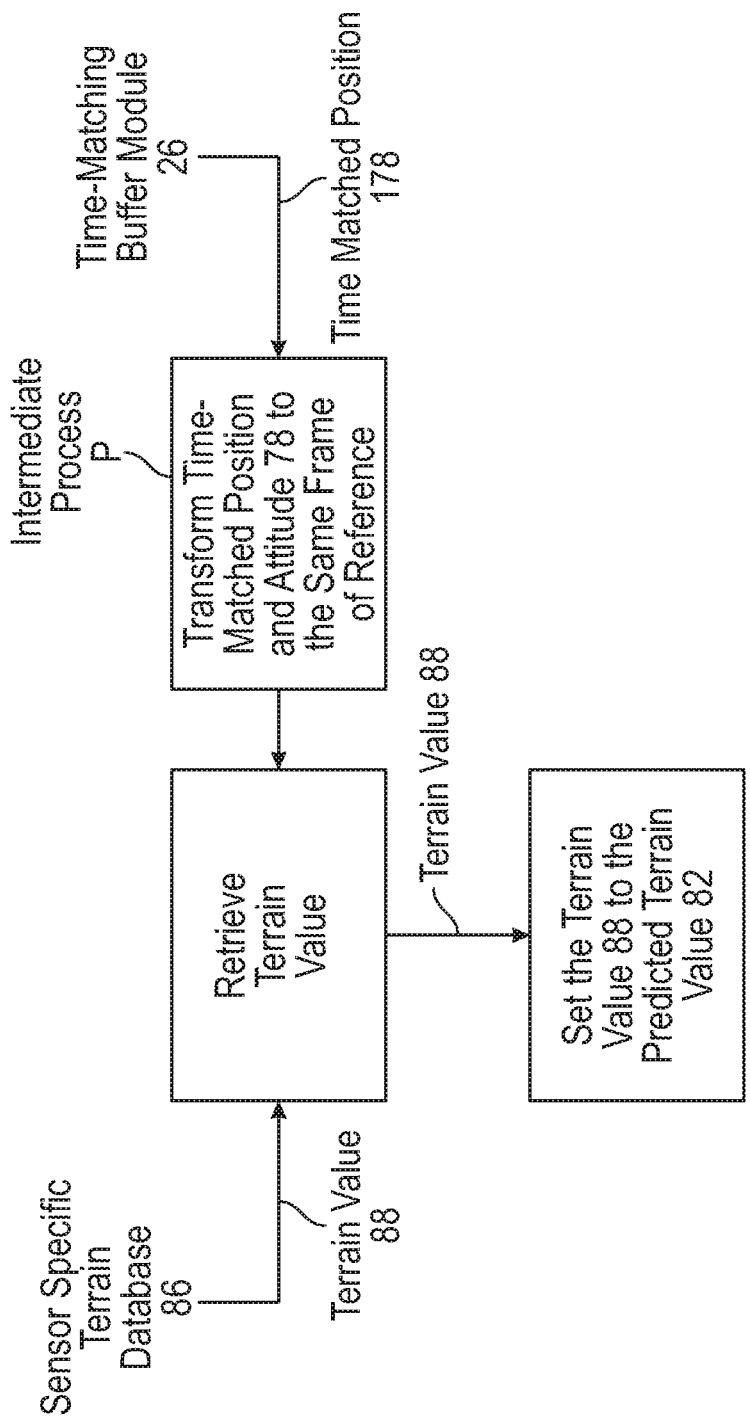
FIG. 3B is a flow diagram illustrating an attitude independent sensor prediction block shown in FIG. 3A determining a corresponding predicted terrain value, according to an exemplary embodiment.

Each attitude independent sensor prediction block 46 determines a corresponding predicted terrain value 82 by retrieving a terrain value 88 from a corresponding sensor specific terrain database 86. FIG. 3B is a flow diagram explaining how the attitude independent sensor prediction block 46 determines the corresponding predicted terrain value 82. Referring to both FIGS. 3A and 3B, the attitude independent sensor prediction block 46 receives two inputs. The first input is the terrain value 88 from the sensor specific terrain database 86 and the second input is the time-matched position and attitude 78 from the time-matching buffer module 26. The attitude independent sensor prediction block 46 first performs an intermediate process P of transforming the time-matched position 178 from the time-matching buffer module 26 into the same frame of reference as the digital data stored in the one or more sensor specific terrain databases 86 (e.g., either ECEF or latitude, longitude, and altitude). The attitude independent sensor prediction block 46 then retrieves the terrain value 88 from the sensor specific terrain database 86 corresponding to the transformed time-matched position and attitude 78 determined in the intermediate process P. As seen in FIG. 3B, the terrain value 88 is set to the predicted terrain value 82.

Referring to FIG. 3A, the predicted terrain value 82 is then sent to the corresponding attitude independent sensor pre-Kalman Filter processing block 48. The attitude independent sensor pre-Kalman Filter processing block 48 determines pre-Kalman filter processing values 84 between the predicted terrain value 82 and the measured terrain value (i.e., the attitude independent measured terrain values 80). The pre-Kalman filter processing values 84 are sent to the Kalman filter 30 (FIG. 1). As explained below, the Kalman filter 30 determines the navigation corrections 32 and the sensor corrections 34 based at least in part on the pre-Kalman filter processing values 84 from the attitude independent sensor pre-Kalman Filter processing block 48. The pre-Kalman filter processing values 84 include a residual r, a Kalman filter residual and sensitivity matrix (H-matrix), and a measurement noise covariance matrix, which is referred to as an R-matrix. The residual r represents the difference between the predicted terrain value 82 and the attitude independent measured terrain values 80, the H-matrix is a matrix that maps a state to a measurement in a linearized error equation that indicates how error in the navigation solution (FIG. 1) and states in the Kalman filter 30 (FIG. 1) affect the predicted terrain value 82. The R-matrix indicates a level of uncertainty or variances of the measurements collected by the attitude independent terrain sensors 40.

The pre-Kalman filter processing values 84 determined for each of the attitude independent terrain sensors 40 are sent to the Kalman filter 30. The Kalman filter 30 is configured to generate the navigation corrections 32 (i.e., the position corrections, the velocity corrections, and the attitude corrections of the vehicle 12) based on at least in part on the pre-Kalman filter processing values 84. In addition, the Kalman filter 30 estimates sensor corrections 34, which include corrections to the sensors 60 of the inertial measurement unit 20 (seen in FIG. 2) as well as corrections to the attitude independent terrain sensors 40 based on the pre-Kalman filter processing values 84.

Figure 4A:
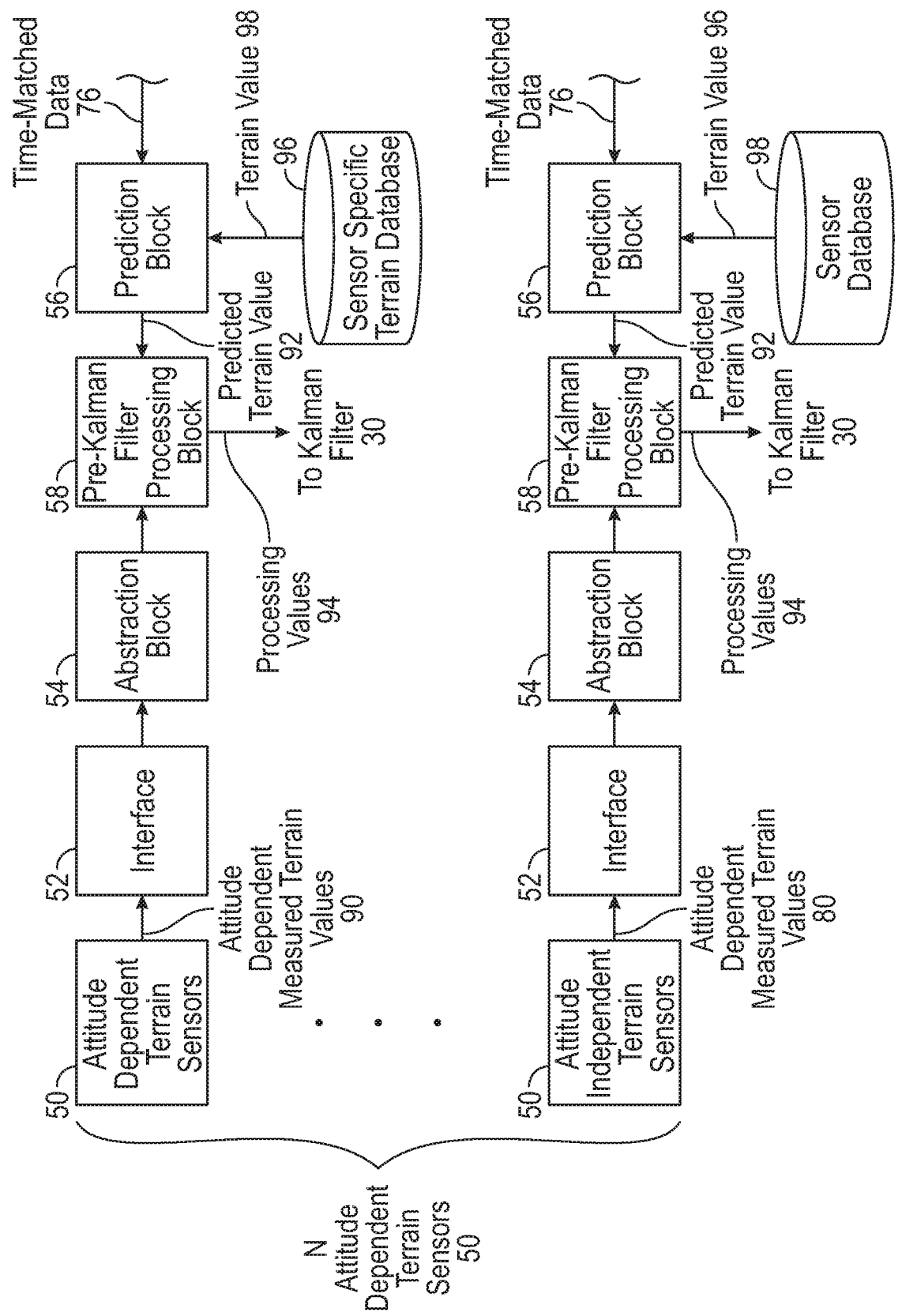
FIG. 4A is a block diagram of one or more attitude dependent terrain sensors that are part of the terrain referenced navigation system shown in FIG. 1, where the attitude dependent terrain sensors collect attitude dependent measured terrain values, according to an exemplary embodiment.

The attitude dependent terrain sensors 50 are now described. Referring to FIGS. 1 and 4A, the terrain referenced navigation system 10 includes N attitude dependent terrain sensors 50, where N is any whole number. Each attitude dependent terrain sensor 50 is in electronic communication with a corresponding attitude dependent sensor interface 52, an attitude dependent sensor abstraction module 54, an attitude dependent sensor prediction block 56, and attitude dependent sensor pre-Kalman Filter processing block 58. Each of the attitude dependent terrain sensors 50 are in electronic communication with the rest of the terrain referenced navigation system 10 by a corresponding attitude dependent sensor interface 52. Similar to the attitude independent terrain sensors 40, the attitude dependent terrain sensors 50 collect measured terrain values associated with the current position of the vehicle 12, which is also predicted using data collected by the inertial measurement unit 20, and generate a time sequence of attitude dependent measured terrain values 90 that are sent to the corresponding attitude dependent sensor interface 52. The attitude dependent sensor abstraction modules 54 process and encode the attitude dependent measured terrain values 90 generated by the attitude dependent terrain sensors 50. The attitude dependent measured terrain values 90 collected by the attitude dependent terrain sensors 50 are then sent to the corresponding attitude dependent sensor pre-Kalman filter processing block 58.

Figure 4B:
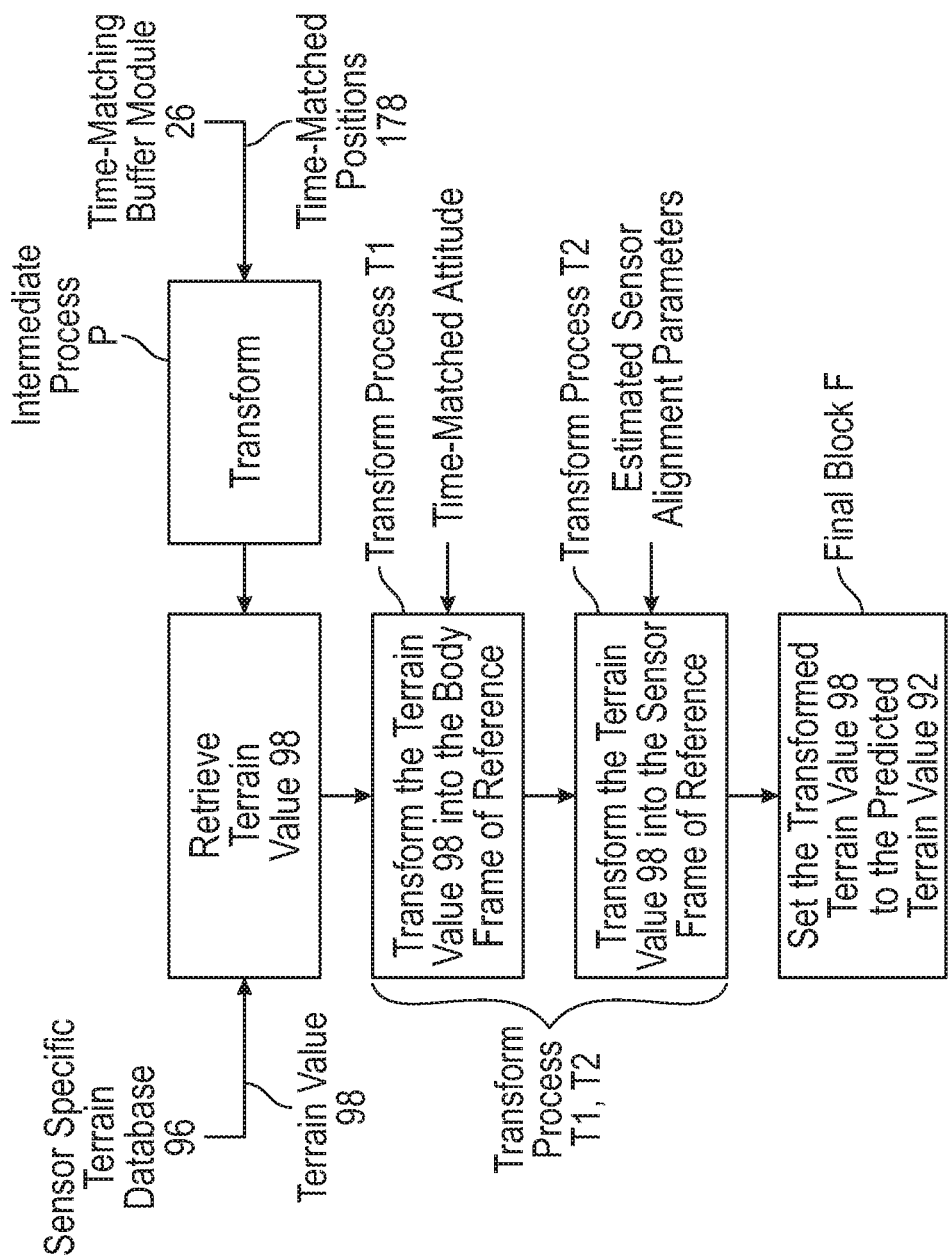
FIG. 4B is a flow diagram illustrating an attitude dependent sensor prediction block shown in FIG. 4A determining a corresponding predicted terrain value, according to an exemplary embodiment.

FIG. 4B is a flow diagram explaining how the attitude dependent sensor prediction block 56 determines the corresponding predicted terrain value 92. Referring to both FIGS. 4A and 4B, the attitude dependent sensor prediction block 56 receives two inputs. The first input is the terrain value 98 from the corresponding sensor specific database 96 and the second input is the time-matched position 178 from the time-matching buffer module 26 (FIG. 1). The attitude dependent sensor prediction block 56 first performs the intermediate process P of transforming the time-matched position 178 from the time-matching buffer module 26 into the same frame of reference as the digital data stored in the one or more sensor specific terrain databases 96 (e.g., either ECEF or latitude, longitude, and altitude). The attitude dependent sensor prediction block 56 then retrieves the terrain value 98 from the sensor specific terrain database 96 corresponding to the transformed time-matched position 178 determined in the intermediate process P.

The terrain value 98 then undergoes two transform processes T1, T2. Specifically, in the first transform process T1 transforms the terrain value 98 into a body frame of reference using a time-matched attitude from the time-matched buffer module 26 (FIG. 1). The second transform process T2 transforms the terrain value 98, which is in the body frame of reference, into a sensor frame of reference using estimated sensor alignment parameters, where the sensor frame of reference applies to the specific attitude dependent terrain sensor 50. Some examples of estimated sensor alignment parameters include, but are not limited to, three rotational misalignment corrections (for each of the rotational axes) and three non-orthogonal misalignment correction. As seen in the final block F of FIG. 4B, the terrain value 98, which is now expressed in the sensor frame of reference, is set to the predicted terrain value 92.

Referring back to FIG. 4A, the predicted terrain value 92 is then sent to an attitude dependent sensor pre-Kalman Filter processing block 58 that determines pre-Kalman filter processing values 94 between the predicted terrain value 92 and the attitude dependent measured terrain values 90, where the pre-Kalman filter processing values 94 and the associated H matrix and R-matrix are sent to the Kalman filter 30. The Kalman filter 30 is configured to generate the navigation corrections 32 and the sensor correction 34 based on at least in part on the pre-Kalman filter processing values 94 from each of the attitude dependent terrain sensors 50.

Figure 5:
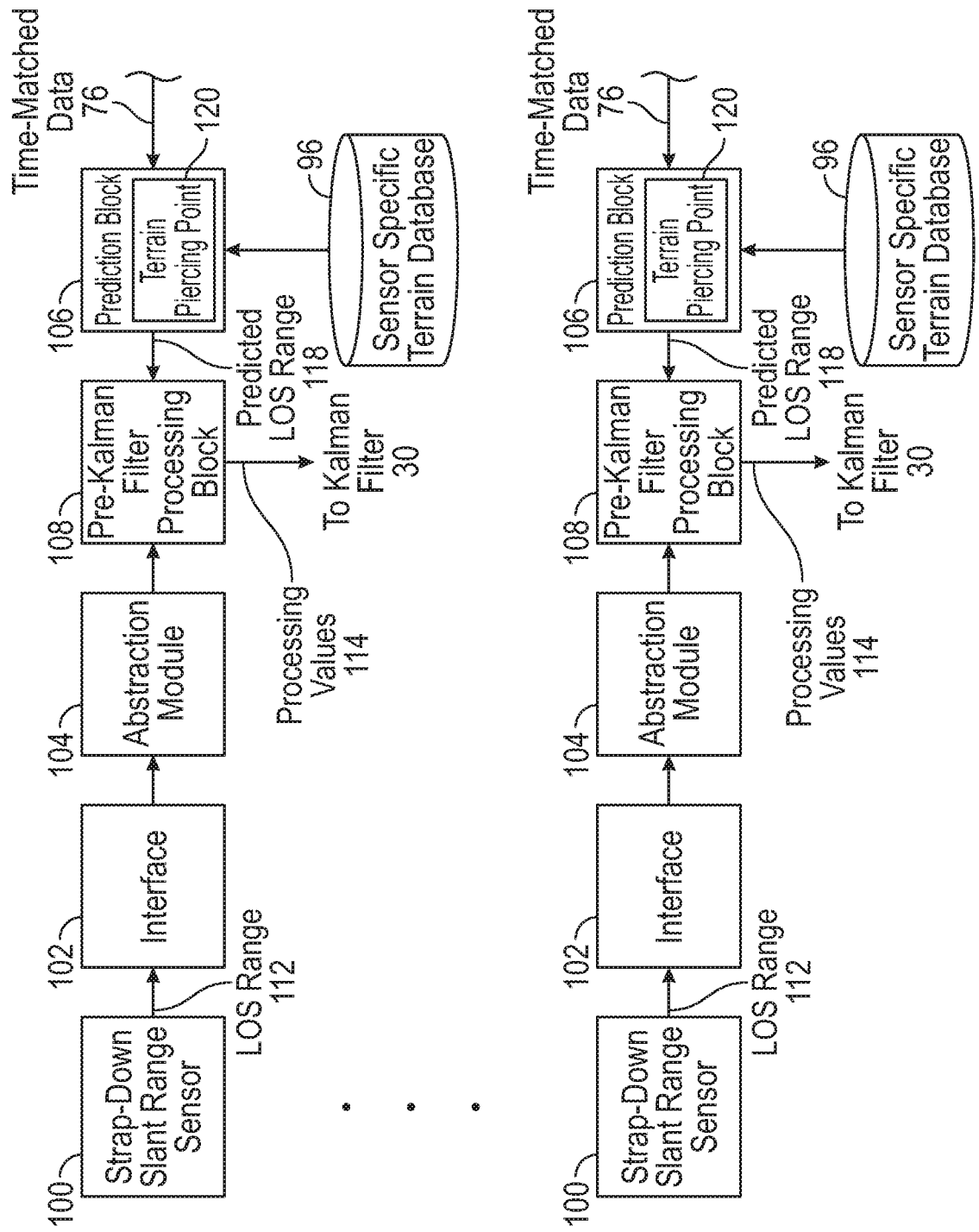
FIG. 5 is a block diagram of one or more strap-down slant range sensors that are part of the terrain referenced navigation system shown in FIG. 1, where the strap-down slant range sensors determine a line-of-sight (LOS) range between the strap-down slant range sensor and a terrain piercing point of an LOS vector, according to an exemplary embodiment.
Figure 6:
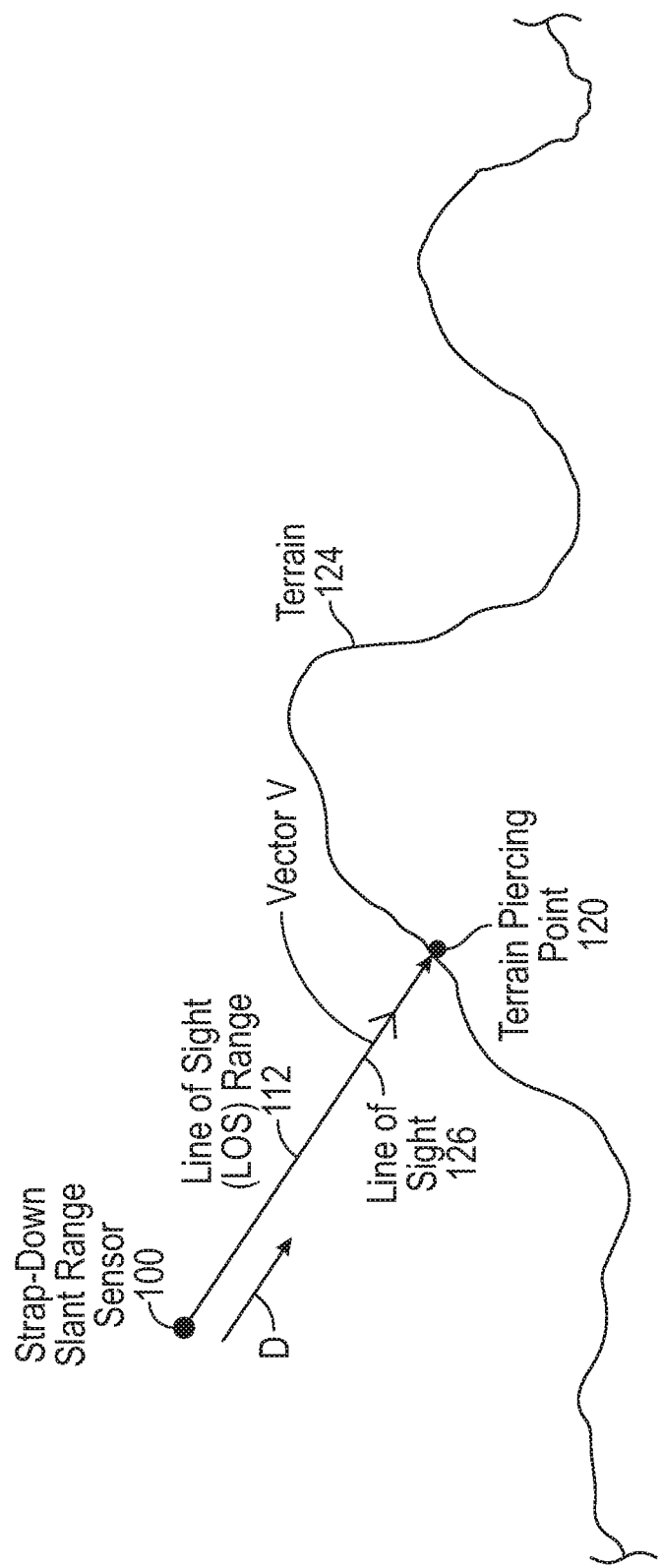
FIG. 6 illustrates an exemplary terrain piercing point, according to an exemplary embodiment.

Referring to FIGS. 1, 5, and 6, in an embodiment the attitude dependent terrain sensors 50 include the one or more strap-down slant range sensors 100. Similar to the embodiments as shown in FIGS. 3A and 4A, each strap-down slant range sensor 100 is in electronic communication with a corresponding slant range sensor interface 102, a slant range abstraction module 104, a line-of-sight (LOS) sensor prediction block 106, and a LOS pre-Kalman Filter processing block 108, where each LOS pre-Kalman Filter processing block 108 determines pre-Kalman filter processing values 114.

The strap-down slant range sensors 100 measure a LOS range 112 (FIG. 6). The LOS range 112 is measured in units of distance and represents a measured value between a particular strap-down slant range sensor 100 and a terrain piercing point 120. Specifically, the terrain piercing point 120 represents an intersecting point between a line-of-sight vector V of the strap-down slant range sensor 100 and the terrain 124 (also seen in FIG. 6). The strap-down slant range sensors 100 are in electronic communication with the remaining portion of the terrain referenced navigation system 10 by a corresponding one of the strap-down slant range sensor interfaces 102. The slant range abstraction module 104 processes and encodes the LOS range 112 generated by the strap-down slant range sensors 100. The LOS range 112 collected by the strap-down slant range sensors 100 are then sent to a corresponding LOS sensor prediction block 106 that determines a corresponding predicted LOS range 118.

The LOS sensor prediction block 106 determines the predicted LOS range 118 by iteratively solving a set of non-linear equations that involve the one or more sensor specific terrain databases 86, 96. Specifically, the predicted LOS range 118 is determined based on two data points, namely, a position of the particular strap-down slant range sensor 100 and the terrain piercing point 120 (shown in FIG. 6). Referring now to FIG. 6, the LOS range 112 is shown. The terrain piercing point 120 represents a point on the terrain 124 where a line-of-sight 126 of a particular strap-down slant range sensor 100 intersects the terrain 124. Turning back to FIG. 5, the LOS sensor prediction block 106 executes an iterative algorithm that solves for the terrain piercing point 120 and the predicted range. Specifically, in an embodiment, the LOS sensor prediction block 106 iteratively solves two equations to determine a value for the terrain piercing point 120 and the predicted range. The two equations include a measurement equation, which is shown below as Equation 1, and a constraint equation, which is shown below as Equation 2. Equations 1 and 2 are listed below as:

$$R_{PP} = R_B + u_s * d \quad \text{Equation 1}$$

$$g(R_{PP}) = h_{pp} - \gamma(\text{lat}_{pp}, \text{lon}_{pp}) = 0 \quad \text{Equation 2}$$

where $R_{PP}$ represents the terrain piercing point 120, $R_B$ represents a location of the position of a particular strap-down slant range sensor 100, $u_s$ represents a unit vector oriented in the same direction D of the particular strap-down slant range sensor 100 (seen in FIG. 6), and d represents the LOS range 112 in Equation 1. In Equation 2, $h_{pp}$ represents a height above geoid of the terrain piercing point 120, $\text{lat}_{pp}$ represents a latitude of the terrain piercing point 120, $\text{lon}_{pp}$ represents a longitude of the terrain piercing point 120, and $\gamma(\text{lat}_{pp}, \text{lon}_{pp})$ represents a terrain value 128 from the sensor specific terrain database 96. The terrain value 128 represents a terrain height retrieved from the sensor specific terrain databases 96. The constraint equation states that for a given value for the terrain piercing point 120, the height above geoid of the terrain $h_{pp}$ is equal to the terrain height $\gamma(\text{lat}_{pp}, \text{lon}_{pp})$ selected from the sensor specific terrain databases 96.

The LOS sensor prediction block 106 iteratively solves for the terrain piercing point 120 (represented in Equation 1 as $R_{PP}$). Specifically, the LOS range 112 (which is represented in Equation 2 as d) is set to a particular value, and the LOS sensor prediction block 106 iteratively solves for the terrain piercing point 120 until the constraint equation (Equation 2) is within a predetermined threshold to zero. The predetermined threshold is based on the required accuracy of the terrain referenced navigation system 10, and depend upon the specific application. Once the terrain piercing point 120 is determined, the LOS sensor prediction block 106 solves for the predicted LOS range 118. The predicted LOS value 118 is then sent to a LOS sensor pre-Kalman Filter processing block 108 that determines pre-Kalman filter processing values 114 between the predicted LOS value 118 and the LOS range 112 measured by the strap-down slant range sensors 100. The pre-Kalman filter processing values 114 are sent to the Kalman filter 30 together with the corresponding H-matrix, and R-matrix. Referring to FIGS. 1 and 5, the Kalman filter 30 generates the navigation corrections 32 and the sensor corrections 34 based on at least in part on the pre-Kalman filter processing values 114.

Referring generally to FIGS. 1-5, the H-matrix H shall now be described. The H-matrix includes two components. Specifically, the H-matrix component that describes sensitivity to position is represented as $H_{pos}$ and the H-matrix component that describes sensitivity to attitude is represented as $H_{att}$. However, it is to be appreciated that the attitude independent terrain sensors 40 only the sensitivity to position $H_{pos}$ is non-zero. For example, Equation 3 is a prediction equation used to determine the sensitivity to position $H_{pos}$ for an attitude independent barometric altimeter, and Equation 4 expresses the sensitivity to position $H_{pos}$ for the attitude independent barometric altimeter.

$$\hat{h}_{baro} = h_e(\hat{r}_B^E) + \delta h(\hat{r}_B^E) + \hat{b}_b \quad \text{Equation 3}$$

$$H_{pos} = \frac{\partial h_e(\hat{r}_B^E)}{\partial \hat{r}_B^E} \quad \text{Equation 4}$$

where $\hat{r}_B^E$ is an estimated vehicle position expressed in ECEF coordinates, $h_e(\hat{r}_B^E)$ is a function that converts the estimated vehicle position into an ellipsoidal altitude, $\delta h(\hat{r}_B^E)$ is a spherical harmonic model that models a difference between the ellipsoidal altitude and a geoid, and $\hat{b}_b$ represents estimated sensor bias. It is to be appreciated that the ellipsoid attitude to geoid correction is ignored.

In another example, an attitude independent radar altimeter is described. Equation 5 is the prediction equation used to determine the sensitivity to position $H_{pos}$ for the attitude independent radar altimeter, and Equation 6 expresses the sensitivity to position $H_{pos}$ for the attitude independent radar altimeter.

$$\hat{h}_{radar} = h_e(\hat{r}_B^E) - \eta(lat(\hat{r}_B^E), lon(\hat{r}_B^E)) + \hat{b}_r \quad \text{Equation 5}$$

$$H_{pos} = \frac{\partial h_e(\hat{r}_B^E)}{\partial \hat{r}_B^E} - \quad \text{Equation 6}$$

$$\frac{\partial \eta(lat(\hat{r}_B^E), lon(\hat{r}_B^E))}{\partial lat(\hat{r}_B^E)} \frac{\partial lat(\hat{r}_B^E)}{\partial \hat{r}_B^E} - \frac{\partial \eta(lat(\hat{r}_B^E), lon(\hat{r}_B^E))}{\partial lon(\hat{r}_B^E)} \frac{\partial lon(\hat{r}_B^E)}{\partial \hat{r}_B^E}$$

wherein $\eta(lat(\hat{r}_B^E), lon(\hat{r}_B^E))$ is the terrain altitude above the ellipsoid as a function of latitude and longitude, where the latitude and longitude are converted from $\hat{r}_B^E$, and $\hat{b}_r$ is the estimated sensor bias. In still another example, an attitude independent gravimeter is described. Equation 7 is the prediction equation used to determine the sensitivity to position $H_{pos}$ for the attitude independent gravimeter, and Equation 6 expresses the sensitivity to position $H_{pos}$ for the attitude independent gravimeter.

$$\hat{\gamma}_{grav} = \eta(lat(\hat{r}_B^E), lon(\hat{r}_B^E)) + \hat{b}_g \quad \text{Equation 7}$$

$$H_{pos} = \quad \text{Equation 8}$$

$$\frac{\partial \eta(lat(\hat{r}_B^E), lon(\hat{r}_B^E))}{\partial lat(\hat{r}_B^E)} \frac{\partial lat(\hat{r}_B^E)}{\partial \hat{r}_B^E} + \frac{\partial \eta(lat(\hat{r}_B^E), lon(\hat{r}_B^E))}{\partial lon(\hat{r}_B^E)} \frac{\partial lon(\hat{r}_B^E)}{\partial \hat{r}_B^E}$$

where $\hat{b}_g$ is the estimated sensor bias.

In yet another embodiment, a strap-down slant range sensor is described. Because the strap-down slant range sensors are attitude dependent sensors, the sensitivity to attitude $H_{att}$ is also calculated. As mentioned above, the LOS sensor prediction block 106 (shown in FIG. 5) iteratively solves for the terrain piercing point 120 until the constraint equation (Equation 2) is within a predetermined threshold to zero. The terrain piercing point 120 also satisfies Equation 9, which is a terrain constraint function that is expressed as:

$$g(r_{pp}^E) = h_e(r_{pp}^E) - \gamma(lat(r_{pp}^E), lon(r_{pp}^E)) = 0 \quad \text{Equation 9}$$

where $r_{pp}^E$ represents the terrain piercing point 120 in the ECEF frame of reference, $h_e(r_{pp}^E)$ represents the function that converts the terrain piercing point 120 from the ECEF frame of reference to an ellipsoidal altitude, $\gamma(lat(r_{pp}^E), lon(r_{pp}^E))$ represents a terrain altitude above the ellipsoid as a function of latitude and longitude, where the latitude and longitude are converted from $r_{pp}^E$. Equation 10 is an equation to convert a sensor boresight axis in the body frame of reference to the ECEF frame of reference and is expressed as:

$$u_s^E = C_B^E * u_s^B \quad \text{Equation 10}$$

where $C_B^E$ represents an attitude of the strap-down slant range sensor with respect to the ECEF frame and $u_s^B$. Represents the sensor boresight axis.

Equation 11 represents an initial starting point that is selected for the terrain piercing point 120, and is expressed as:

$$\begin{bmatrix} \delta r_{pp}^E \\ \delta d \end{bmatrix} = \quad \text{Equation 11}$$

-continued $$\begin{bmatrix} I_{3x3} & -u_s^E \\ g_R(r_{pp}^E) & 0 \end{bmatrix}^{-1} \begin{bmatrix} \hat{r}_B^E + du_s^E - r_{pp}^E \\ -g(r_{pp}^E) \end{bmatrix} \begin{bmatrix} r_{pp}^E \\ d \end{bmatrix} = \begin{bmatrix} r_{pp}^E \\ d \end{bmatrix} + \begin{bmatrix} \delta r_{pp}^E \\ \delta d \end{bmatrix}$$

$$g_R(r_{pp}^E) = \frac{\partial g(r_{pp}^E)}{\partial r_{pp}^E}$$

where represents a gradient of the terrain constraint function (Equation 9) and d is represents a range to the strap-down slant range sensor. It is to be appreciated that Equation 11 is iterated until the terrain constraint equation is satisfied within the predetermined threshold to zero.

Once the terrain piercing point 120 and the range d is determined, the sensitivity to position $H_{pos}$ and the sensitivity to attitude $H_{att}$ are determined by Equations 12, 13, and 14:

$$G = G(1:4, 1:4) = \begin{bmatrix} I_{3x3} & -u_s^E \\ g_R(r_{pp}^E) & 0 \end{bmatrix}^{-1} \quad \text{Equation 12}$$

$$H_{pos} = G(4, 1:3) \quad \text{Equation 13}$$

$$H_{att} = G(4, 1:3)d[u_s^E \times] \quad \text{Equation 14}$$

where $[u_s^E \times]$ represents a skew symmetric matrix of the boresight.

Referring to FIG. 1, in an embodiment, the one or more sensor specific terrain databases 86, 96 may include datasets having a relatively high resolution. However, if the values in the one or more sensor specific terrain databases 86, 96 are of very high resolution, the terrain-dependent values may change significantly when traveling only a very small distance. In one example, a high resolution database may interfere with the LOS sensor prediction block 106 being able to iteratively solve for Equations 1 and 2 mentioned above. Therefore, in one embodiment, the terrain referenced navigation system 10 dynamically calculates average values of the datapoints located in the one or more sensor specific terrain databases 86, 96, where the average values represent an effective resolution of the one or more sensor specific terrain databases 86, 96, and the average values are set to the terrain value 88, 98, 128. The terrain referenced navigation system 10 calculates the average values dynamically as the vehicle 12 travels along the terrain. It is to be appreciated that utilizing the average value provides the level of fidelity required to iteratively solve for Equations 1 and 2 above.

Continuing to refer to FIG. 1, in another embodiment the Kalman filter 30 checks the residual r to determine if the residual r is consistent with the remaining data points collected by the respective terrain sensors 40, 50, and 100. The Kalman filter is configured to detect and remove an incorrect value generated by one of the terrain sensors 40, 50, and 100 in response to determining a variance of the residual r does not fall within a predetermined range as predicted by an error covariance matrix P. The variance of the error covariance matrix P represents captures an estimate of the variance of the filter state. A smaller variance indicates less uncertainty, and a higher variance indicates more uncertainly.

The variance of the residual r is expressed in Equations 15 and 16 as:

$$|\text{residual } r_k| < \text{factor} * \sqrt{(\text{variance of residual } r_k)} \quad \text{Equation 15}$$

$$(\text{residual } r_k)^2 < \text{factor}^2 * (\text{variance of residual } r_k) \quad \text{Equation 16}$$

where k is an index into a residual vector, and Equation 15 is equivalent to Equation 16, and the factor represents a confidence factor and includes a value greater than three. The factor is greater than three because if the residual value r is a Gaussian distribution, then there is a 99.73% probability that the residual r is less than three times the square root of the variance of the residual. However, the value of the factor may be chosen based on the distribution of the random variables in the terrain referenced navigation system.

If the Kalman filter 30 determines that Equations 3 and 4 are false, then the value of the residual r does not fall within a predetermined range, and the residual r may adversely affect the accuracy of the navigation solution. Accordingly, the Kalman filter 30 determines the residual r is an outlier based on the variance of the residual r. In response to determining the residual r is an outlier, the residual r is disregarded when determining the navigation corrections 32 and the sensor correction 34. In an embodiment, if the residual r is persistently determined to be an outlier, then the Kalman filter 30 may remove the sensor corresponding to the residual r from further calculations, since this is an indication that the data collected by the corresponding sensor 40, 50, and 100 has become corrupted.

Referring to FIGS. 1 and 5, in one embodiment, the terrain referenced navigation system 10 includes two or more slant range sensors 100, where each slant range sensor 100 measures a unique LOS range 112. Each unique value for the LOS range 112 is determined separately, and the measurements are then combined into an overall measurement in order to determine the navigation corrections 32 and the sensor corrections 34.

Figure 7:
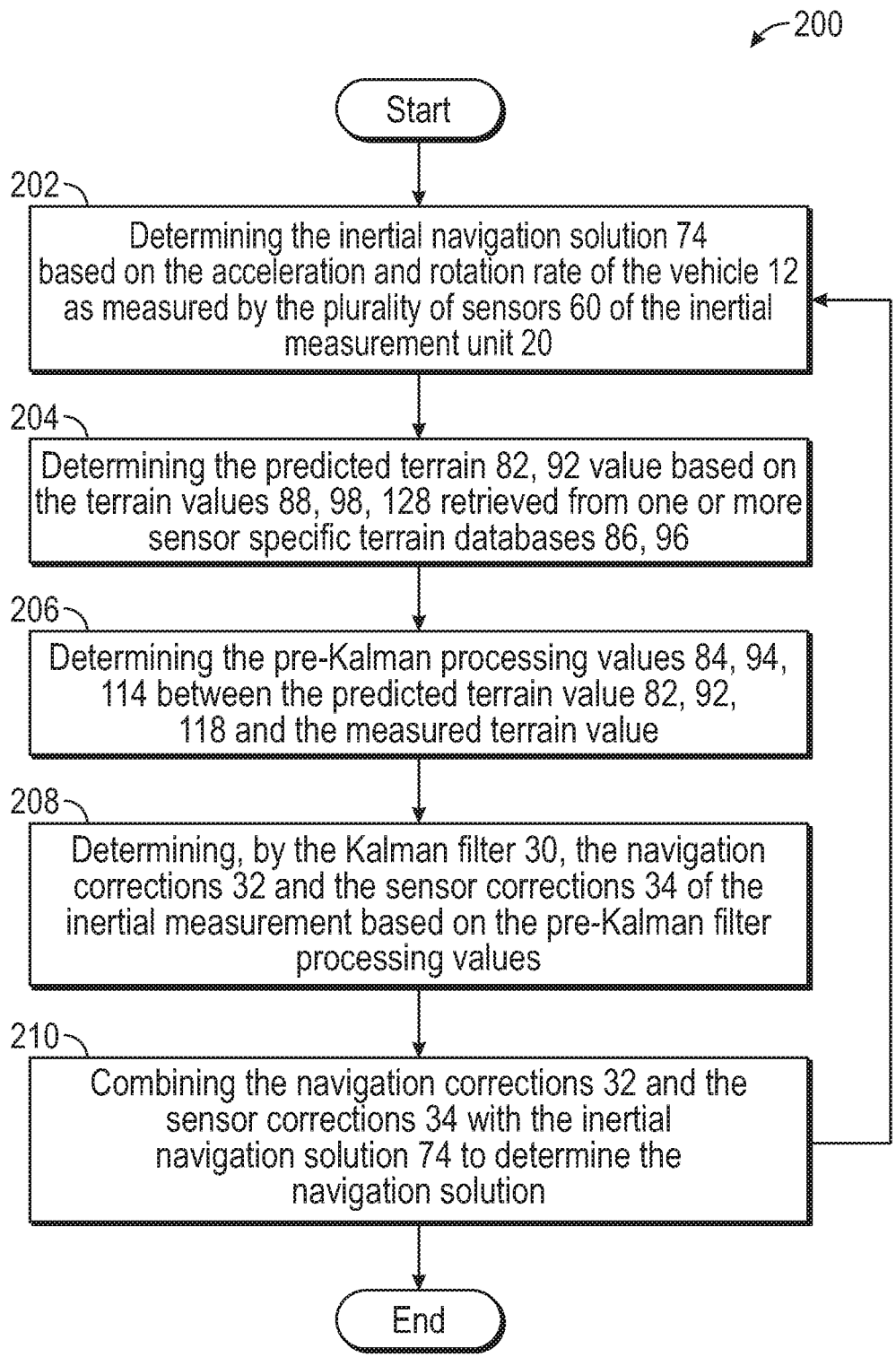
FIG. 7 is a process flow diagram illustrating a method for determining a navigation solution using the terrain referenced navigation system shown in FIG. 1, according to an exemplary embodiment.

FIG. 7 is an exemplary process flow diagram illustrating a method 200 for determining the navigation solution by the disclosed terrain referenced navigation system 10. Referring generally to FIGS. 1-7, the method 200 begins at block 202. In block 202, the inertial navigation module 28 determines the inertial navigation solution 74 based on the acceleration and rotation rate of the vehicle 12 as measured by the plurality of sensors 60 of the inertial measurement unit 20. The method 200 may then proceed to block 204.

In block 204, the terrain referenced navigation system 10 determines the predicted terrain value 82, 92 based on the terrain value 88, 98, 128, where the terrain value 88, 98, 128 is retrieved from one or more sensor specific terrain databases 86, 96 and represents a predicted terrain-dependent value that corresponds to a particular data type being measured by the one or more generic terrain sensors 18.

Referring to FIG. 3, if the generic terrain sensors 18 include the one or more attitude independent terrain sensors 40, then the attitude independent sensor prediction block 46 determines a predicted terrain value 82 based on the terrain value 88, where the terrain value 88 is retrieved from the sensor specific terrain database 86. Similarly, referring to FIG. 4A, if the generic terrain sensors 18 include one or more attitude dependent terrain sensors 50, then the attitude dependent sensor prediction block 56 determines the predicted terrain value 92 based on the terrain value 98, where the terrain value 98 is retrieved from the sensor specific terrain database 96. Referring to FIG. 5, if the generic terrain sensors 18 are the strap-down slant range sensors 100, then the LOS sensor prediction block 106 determines the predicted LOS range 118 based on comparing the measured terrain value (i.e., the LOS range 112) with the terrain value 128 retrieved from the one or more sensor specific terrain databases 96. The method 200 may then proceed to block 206.

In block 206, the terrain referenced navigation system 10 determines pre-Kalman filter processing values 84, 94, 114 between the predicted terrain value 82, 92, 118 and the measured terrain value. As mentioned above, the values sent to the pre-Kalman filter processing block 48, 58, 108 include the residual r, the H-matrix and the R-matrix, and are shown in FIG. 3-5. The method 200 may then proceed to block 208.

In block 208, the Kalman filter 30 determines the navigation corrections 32 and the sensor corrections 34 based on the pre-Kalman filter processing values 84, 94, 114. The method 200 may then proceed to block 210.

In block 210, the sensor corrections 34 are applied to the inertial navigation solution 74, and the navigation corrections 32 then correct the inertial navigation solution 74, which is the navigation solution that is output by the terrain referenced navigation system 10. The method 200 may then terminate or, alternatively, return to block 202.

Referring generally to the figures, the disclosed terrain referenced navigation system offers various technical effects and benefits. Specifically, the terrain referenced navigation system may support various types of terrain sensors and the combinations based on the same software architecture and substantially the same software. Accordingly, any combination of generic terrain sensors may be used to determine the navigation corrections and the sensor corrections without the need to change hardware architecture or the software architecture in the terrain referenced navigation system. In an embodiment, multiple generic terrain sensors may be used to determines navigation and sensor corrections as well, which results in improved performance, since more measurements may be taken. Multiple generic terrain sensors also result in enhanced availability due to the fact is one terrain sensor becomes inoperative, then other terrain sensors may still be used to provide the information required to determine the navigation solution. Furthermore, multiple generic terrain sensors also improve integrity, since the navigation system determines the residual for each type of generic terrain sensor and determines if the residual value is consistent with the other data points being collected. Furthermore, integrity is also enhanced since any erroneous data is discarded. If the value of the residual is determined to be an outlier, then the residual value is disregarded when determining navigation corrections.

Figure 8:
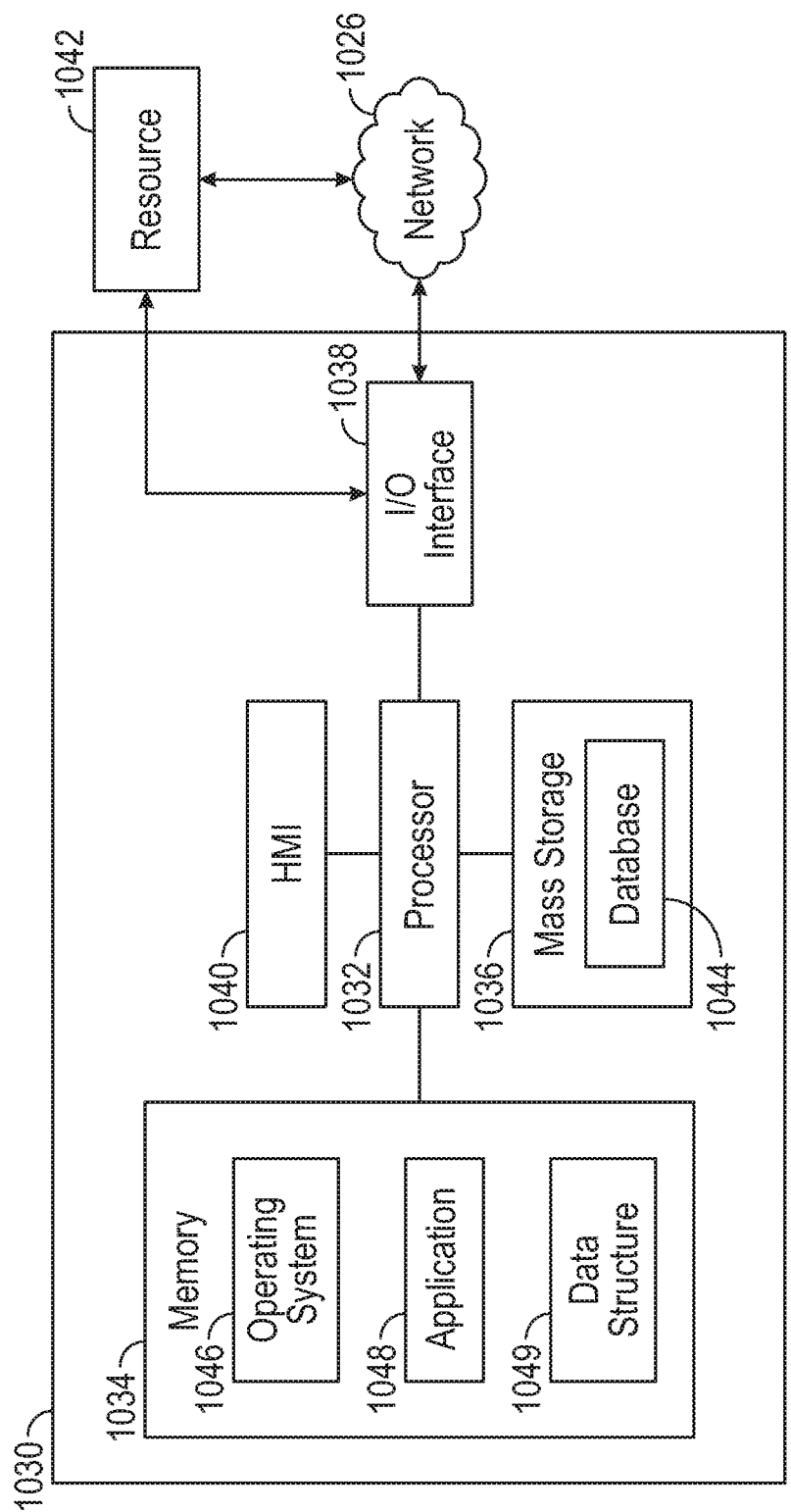
FIG. 8 is a computer system that is used in connection with the disclosed navigation system, according to an exemplary embodiment.

Referring now to FIG. 8, the terrain referenced navigation system 10 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A terrain referenced navigation system for a vehicle, the terrain referenced navigation system comprising:
    an inertial measurement unit including a plurality of sensors for measuring an acceleration and a rotation rate of the vehicle;
    one or more generic terrain sensors configured to collect terrain-dependent data, wherein the terrain-dependent data includes a measured terrain value, wherein the one or more generic terrain sensors include one or more strap-down slant range sensors that measure a line-of-sight (LOS) range between a particular strap-down slant range sensor and a terrain piercing point, wherein the terrain piercing point represents a point on a terrain where a line-of-sight of the particular strap-down slant range sensor intersects the terrain;
    one or more processors in electronic communication with the one or more generic terrain sensors and the inertial measurement unit; and
    a memory coupled to the one or more processors, the memory storing data into one or more databases and program code that, when executed by the one or more processors, causes the terrain referenced navigation system to:
        determine an inertial navigation solution based on the acceleration and the rotation rate of the vehicle measured by the plurality of sensors of the inertial measurement unit;
        determine a predicted terrain value based on a terrain value and a time-matched position and time-matched attitude of the vehicle, wherein the terrain value is retrieved from one or more sensor specific terrain databases and represents a predicted terrain-dependent value that corresponds to a particular data type being measured by the one or more generic terrain sensors, wherein determining the predicted terrain value includes:
            determining a predicted LOS range based on a position of the particular strap-down slant range sensor and the terrain piercing point, wherein the terrain piercing point represents an intersecting point between a line-of-sight vector of the particular strap-down slant range sensor and a terrain; and
            iteratively solving two equations to determine a value for the terrain piercing point, wherein the two equations include a measurement equation and a constraint equation;
        determine pre-Kalman filter processing values between the predicted terrain value and the measured terrain value, wherein the pre-Kalman filter processing values include a residual, a sensitivity matrix, and a measurement noise covariance matrix, wherein determining the pre-Kalman processing values include determining a difference between the predicted LOS range and the LOS range measured by the particular strap-down slant range sensor;

determine, by a Kalman filter, navigation corrections and sensor corrections based on the pre-Kalman filter processing values; and apply the sensor corrections to the inertial navigation solution and correct the inertial navigation solution with the navigation corrections and to determine a navigation solution, wherein the sensitivity matrix includes a first component that describes sensitivity to position for a particular generic terrain sensor of the one or more generic terrain sensors and a second component that describes sensitivity to attitude for the particular generic terrain sensor.

2. The terrain referenced navigation system of claim 1, wherein the one or more generic terrain sensors include an attitude independent terrain sensor.

3. The terrain referenced navigation system of claim 2, wherein the attitude independent terrain sensor is selected from the group comprising of: a radar altimeter, a lidar altimeter, a gravimeter on a platform, a gravity-gradiometer on a platform, and a magnetometer on a platform.

4. The terrain referenced navigation system of claim 1, further comprising a plurality of attitude independent terrain sensors, wherein a sensor specific database is provided for each of the plurality of attitude independent terrain sensors.

5. The terrain referenced navigation system of claim 1, wherein the one or more generic terrain sensors include an attitude dependent terrain sensor.

6. The terrain referenced navigation system of claim 5, wherein the attitude dependent terrain sensor is selected from the group comprising of: a strap-down slant range sensor, a strap-down lidar sensor, a strap-down sonar sensor, a strap-down gravimeter, a strap-down gravity gradiometer, and a strap-down magnetometer.

7. The terrain referenced navigation system of claim 1, wherein the terrain referenced navigation system dynamically calculates average values of datapoints located in the one or more sensor specific terrain databases, wherein the average values represent an effective resolution of the one or more sensor specific terrain databases.

8. The terrain referenced navigation system of claim 1, wherein the one or more generic terrain sensors include a plurality of attitude independent terrain sensors and a plurality of attitude dependent terrain sensors.

9. The terrain referenced navigation system of claim 1, wherein the measurement equation is expressed as:

$$R_{PP}=R_B+u_s * d$$

wherein $R_{PP}$ represents the terrain piercing point, $R_B$ represents the position of the particular strap-down slant range sensor, $u_s$ represents a unit vector oriented in the direction of the particular strap-down slant range sensor, and d represents the LOS range.

10. The terrain referenced navigation system of claim 1, wherein the constraint equation is expressed as:

$$g(R_{PP})=h_{pp}-\gamma(lat_{pp}, lon_{pp})=0$$

wherein $R_{PP}$ represents the terrain piercing point, $h_{pp}$ represents a height above geoid of the terrain piercing point, $lat_{pp}$ represents a latitude of the terrain piercing point, $lon_{pp}$ represents a longitude of the terrain piercing point, and $\gamma(lat_{pp},lon_{pp})$ represents a terrain height selected from the one or more sensor specific terrain databases.

11. The terrain referenced navigation system of claim 1, wherein the residual represents a difference between the predicted terrain value and attitude independent measured terrain values generated by a plurality of attitude independent terrain sensors.

12. The terrain referenced navigation system of claim 11, wherein the one or more processors execute instructions to:
determine a variance of the residual;
determine the residual is an outlier based on the variance of the residual; and
in response to determining the residual is an outlier, disregard the pre-Kalman filter processing values when determining the navigation corrections.

13. A method for determining a navigation solution by a disclosed terrain referenced navigation system that is part of a vehicle, the method comprising:

determining, by a computer, an inertial navigation solution based on an acceleration and a rotation rate of the vehicle measured by a plurality of sensors that are part of an inertial measurement unit;

determining, by the computer, a predicted terrain value based a terrain value and a time-matched position and a time-matched attitude of the vehicle, wherein the terrain value is retrieved from one or more sensor specific terrain databases and represents a predicted terrain-dependent value that corresponds to a particular data type being measured by one or more generic terrain sensors, wherein the one or more generic terrain sensors include one or more strap-down slant range sensors that measure a LOS range between a particular strap-down slant range sensor and a terrain piercing point, wherein the terrain piercing point represents a point on a terrain where a line-of-sight of the particular strap-down slant range sensor intersects the terrain, and wherein determining the predicted terrain value includes:

determining a predicted LOS range based on a position of the particular strap-down slant range sensor and the terrain piercing point, wherein the terrain piercing point represents an intersecting point between a line-of-sight vector of the particular strap-down slant range sensor and a terrain; and iteratively solving two equations to determine a value for the terrain piercing point, wherein the two equations include a measurement equation and a constraint equation;

determining, by the computer, pre-Kalman filter processing values between the predicted terrain value and a measured terrain value, wherein the pre-Kalman filter processing values include a residual, a sensitivity matrix, and a measurement noise covariance matrix, wherein determining the pre-Kalman processing values include determining a difference between the predicted LOS range and the LOS range measured by the particular strap-down slant range sensor;

determining, by a Kalman filter, navigation corrections and sensor corrections based on the pre-Kalman filter processing values; and applying the sensor corrections to the inertial navigation solution and correcting the inertial navigation solution with the navigation corrections and to determine a navigation solution, wherein the sensitivity matrix includes a first component that describes sensitivity to position for a particular generic terrain sensor of the one or more generic terrain sensors and a second component that describes sensitivity to attitude for the particular generic terrain sensor.

14. The method of claim 13, wherein the one or more generic terrain sensors include a plurality of attitude independent terrain sensors and a plurality of attitude dependent terrain sensors.

15. The terrain referenced navigation system of claim 1, wherein the terrain piercing point satisfies the following equation:

$$g(r_{pp}^E) = h_e(r_{pp}^E) - \gamma(lat(r_{pp}^E), lon(r_{pp}^E)) = 0$$

wherein $r_{pp}^E$ represents the terrain piercing point in a Earth-centered, Earth-fixed (ECEF) frame of reference, $h_e(r_{pp}^E)$ represents a function that converts the terrain piercing point from the ECEF frame of reference to an ellipsoidal altitude, and $\gamma(lat(r_{pp}^E), lon(r_{pp}^E))$ represents a terrain altitude above the ellipsoid as a function of latitude and longitude.

16. The terrain referenced navigation system of claim 12, wherein the variance of the residual is expressed as:

|residual $r_k$| < factor* $\sqrt{}$(variance of residual $r_k$)

wherein k is an index into a residual vector and the factor represents a confidence factor.

17. The terrain referenced navigation system of claim 16, wherein the variance of the residual is expressed as:

(residual $r_k$)² < factor²*(variance of residual $r_k$) = |residual $r_k$| < factor* $\sqrt{}$(variance of residual $r_k$).

18. The terrain referenced navigation system of claim 16, wherein the confidence factor includes a value greater than three.

19. The method of claim 13, wherein the measurement equation is expressed as:

$$R_{PP} = R_B + u_s * d$$

wherein $R_{PP}$ represents the terrain piercing point, $R_B$ represents the position of the particular strap-down slant range sensor, $u_s$ represents a unit vector oriented in the direction of the particular strap-down slant range sensor, and d represents the LOS range.

20. The method of claim 17, wherein the constraint equation is expressed as:

$$g(R_{PP}) = h_{pp} - \gamma(lat_{pp}, lon_{pp}) = 0$$

wherein $R_{PP}$ represents the terrain piercing point, $h_{pp}$ represents a height above geoid of the terrain piercing point, $lat_{pp}$ represents a latitude of the terrain piercing point, $lon_{pp}$ represents a longitude of the terrain piercing point, and $\gamma(lat_{pp}, lon_{pp})$ represents a terrain height selected from the one or more sensor specific terrain databases.

* * * * *